No. 677,002. Patented June 25, 1901.
P. N. TRYON.
CLOTHES LINE APPARATUS.
(Application filed Aug. 14, 1900.)
(Model.)
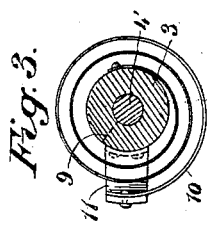
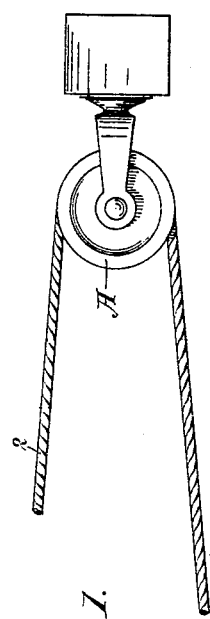
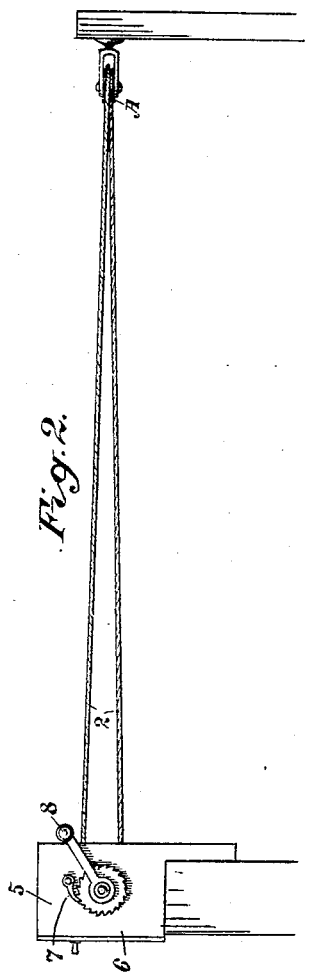
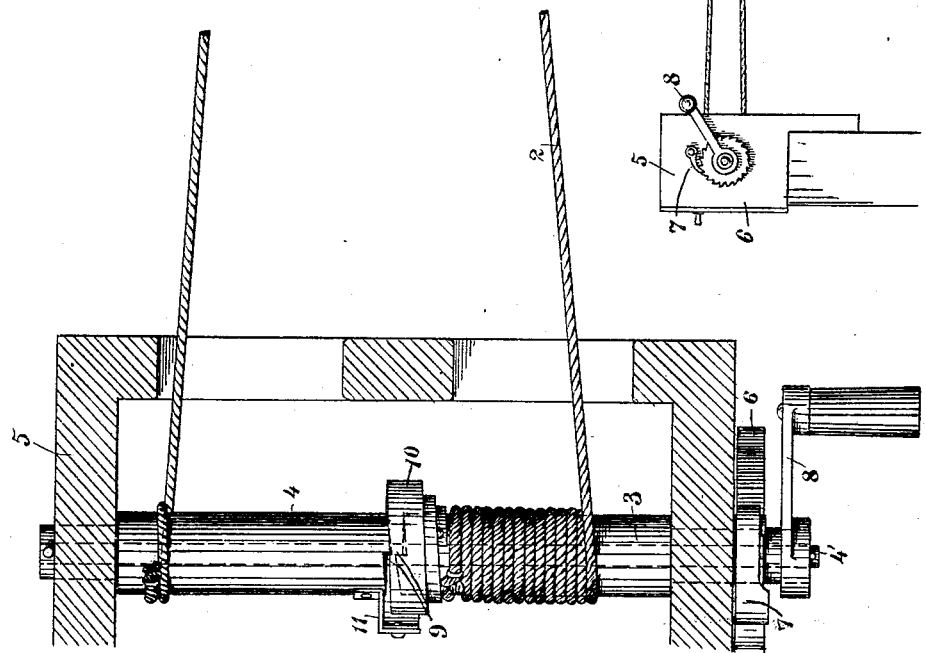
Witnesses,
Inventor
By Philo N. Tryon
Dewey Strong &c
atty

UNITED STATES PATENT OFFICE.

PHILO N. TRYON, OF SAN FRANCISCO, CALIFORNIA.

CLOTHES-LINE APPARATUS.

SPECIFICATION forming part of Letters Patent No. 677,002, dated June 25, 1901.

Application filed August 14, 1900. Serial No. 26,835. (Model.)

*To all whom it may concern:*

Be it known that I, PHILO N. TRYON, a citizen of the United States, residing in the city and county of San Francisco, State of California, have invented an Improvement in Clothes-Line Apparatus; and I hereby declare the following to be a full, clear, and exact description of the same.

My invention relates to a means for winding and unwinding a clothes-line, so that it may be extended to a distance from the operating station when clothes have been hung upon the line and returned to said station as the clothes are removed.

It consists of two shafts or rollers journaled axially in line, each having an interlocking or clutch mechanism by which they may be caused to rotate in unison by the turning of a crank upon the end of one of the rollers and a yielding spring by which they are united, which spring normally retains the clutch members separated and which serves to compensate by its elasticity for any shrinking or stretching of the line caused by wet or dry weather.

My invention also comprises details of construction, which will be more fully explained by reference to the accompanying drawings, in which—

Figure 1 is a horizontal section through the box, showing the interior. Fig. 2 is a side elevation of the device. Fig. 3 is a detail of the spring connecting the rollers.

The object of my invention is to provide improvements in that class of clothes-line apparatus which is designed to be used from porches or elevated points where there is but little room for hanging clothes and where the line is extended from the operating point by passing around a distant fixed pulley, so that the clothes may be hung upon the line and the latter moved out until the line is filled.

The distant pulley A is fixed at any suitable or desired relation with the inner operating end of the clothes-line 2. This line passes around the distant pulley and both parts of the line return from the pulley to the operating station. At this point two shafts or drums 3 and 4 are journaled axially in the same line, having suitable bearings about which they are independently turnable. To protect the parts and for convenience the outer ends of the shafts are shown as journaled in the sides of an inclosing box 5, which may be under lock and key, if desired, and the end of one shaft projecting through the side of the box has fixed upon it a toothed ratchet 6, engaged by a pawl 7, by which the ratchet can be held to prevent the shaft from turning, when desired. A crank 8 enables the operator to turn the shaft in either direction. The two shafts may be kept in line by various methods, the one herein shown consisting in boring through each shaft and inserting a loose rod 4', of sufficient length to fit in the holes, and to form a connection which will keep them in line. The contiguous ends of the two shafts have the engaging lugs, forming clutch members 9, for the following purpose: One part of the line 2 coils over one of the shafts 3 from the top, and the other part of the line coils around the other shaft 4 from below, each portion being secured to a shaft by staple or other fastening, so that when the two shafts are turned in unison one part of the line 2 will unwind from its shaft and the other part will be wound upon its shaft. When the crank is turned so that there is a direct pull upon the shaft 3, the other shaft 4 will turn in unison, and the line passing around the distant pulley A will be unwound from the shaft 4 as fast as it winds upon the shaft 3.

When the clothes are to be hung upon that part of the line which winds upon the shaft 3, it is necessary to move the line outward as fast as an article is secured to the line until the full length of this part of the line is filled with clothes to be dried, but as the two shafts 3 and 4 are loose and independent it would not be possible to thus extend the line except by temporarily connecting the two shafts, and this is done by the clutch members 9, previously described. These members are fitted to engage, so that when the crank is turned so as to unwind the line from the shaft 3 the clutch will engage, so that the power is transmitted directly through the clutch to turn the shaft 4 by direct action of the crank, and thus pull upon that portion of the line which winds upon this shaft and draw the other part of the line carrying the clothes outward. When the line is to be returned upon the shaft 3, the clutch may disengage, because the pull is then directly upon the shaft 3 and the shaft 4 simply turns to allow the line to unwind from it and pass around the distant pulley. In this way the two shafts alternately act upon the line, the shaft 4 acting by reason of the clutch to wind that portion of the line upon itself, and correspondingly extend the part which unwinds from the shaft 3, and the shaft 3 acting to return the line, while the shaft 4 acts as an idler and turns in unison, but without direct connection to allow the line to unwind from itself.

In order to compensate for the shrinking of the line when wet and stretching when dry, I have shown the two shafts as connected by a spring 10. This spring may be of any suitable description which acts axially with the two shafts. It may be a coiled spring surrounding the shafts having one end fixed to one of the shafts and the other by means of a bracket 11 or like device connected with the other. The elasticity of this spring normally retains the clutch members 9 separate from each other; but when the crank is turned to extend the line from the shaft 3 the first action will be to turn the shaft 3 until the action of the spring causes the clutch members to engage, the spring yielding sufficiently for that purpose. The clutch members being thus engaged, the two shafts will then be equivalent to a single rigid shaft and power will be applied to the shaft 4, so as to draw in the line upon that side and wind it upon shaft 4, the line unwinding from the shaft 3 in unison. Whenever the line is to be returned to the shaft 3, the turning of the crank in the opposite direction disengages the clutch and allows its members to separate, so that the only connection between the two shafts is by the elastic spring.

That portion of the line which serves for the reception of clothes is normally coiled upon its shaft 3 within the box when not in use to protect it from the action of the elements and from dust; but the portion which is then exterior to the box is subject to being wet and dry and to consequent shrinkage or extension of length, and this is compensated for by the elasticity of the spring which connects the two shafts 3 and 4. If the line be wet, and thus shrinks and shortens, the two parts of the shaft will be allowed to turn by the yielding of the spring to compensate for this shortening, as the distance between the clutch members is sufficient for that purpose, and when the line again dries the tension of the spring will be sufficient to take up the slack caused by its lengthening.

Having thus described my invention, what I claim as new, and desire to secure by Letters Patent, is—

1. The combination in a clothes-line carrier of a distant pulley about which the bight of the line passes, shafts journaled in line with each other, about one of which the line coils from above and the other from below, a clutch by which the shafts are united to turn in unison in one direction and released when turning in the opposite direction, means by which the shafts may be turned, and an elastic connection between the shafts, yieldingly uniting the latter and providing means for compensating for the shrinking and stretching of the line.

2. The combination with a distant pulley about which the bight of the line passes, of shafts journaled in line, about one of which the line coils from above and the other from below, clutch-faces on the adjacent ends of the shafts, and a torsional connection having one end connected with one of the shafts and the other with the other shaft whereby the clutch-faces are normally separated, said connection serving to compensate by its elasticity for any shrinking or stretching of the line.

3. The combination in a clothes-line apparatus of a distant pulley upon which the bight of the line passes, independent shafts journaled in line with each other, about one of which the line is coiled while it uncoils from the other, a normally-disengaged clutch adapted to engage and turn the shafts in unison in one direction, and a spring having one end connected with one of the shafts and the other with the other shaft whereby an elastic connection is effected.

4. The combination in a clothes-line apparatus of a distant pulley around which the bight of the line passes, independent shafts journaled axially in line around which the ends of the line coil in opposite directions, whereby one portion of the line is coiled upon its shaft while being uncoiled from the other, and a circumferentially-acting connecting-spring whereby the two shafts are yieldingly united, and an automatic compensation for shrinking and stretching is produced.

In witness whereof I have hereunto set my hand.

PHILO N. TRYON.

Witnesses:
S. H. NOURSE,
CHAS. E. TOWNSEND.